United States Patent
Teramoto et al.

[11] Patent Number: 4,845,185
[45] Date of Patent: Jul. 4, 1989

[54] SOLUBLE COPOLYIMIDE FROM 9,9-BIS (4-AMINO PHENYL) FLUORENE

[75] Inventors: Takero Teramoto; Kazuaki Harada; Hiroharu Inoue, all of Kawasaki, Japan

[73] Assignee: Nippon Steel Corporation, Tokyo, Japan

[21] Appl. No.: 38,858

[22] Filed: Apr. 15, 1987

[30] Foreign Application Priority Data

Apr. 22, 1986 [JP] Japan .................................. 61-91355
Mar. 4, 1987 [JP] Japan .................................. 62-47687

[51] Int. Cl.⁴ .......................................... C08G 73/10
[52] U.S. Cl. .................................. 528/229; 524/592; 524/600; 528/353
[58] Field of Search .................. 528/229, 353

[56] References Cited

FOREIGN PATENT DOCUMENTS 56-36520  4/1981  Japan .

OTHER PUBLICATIONS

Polymer Science, USSR, 11:12, 3098–3116, 1969, "The Structure and Properties of Aromatic Polyimides", Vinogradova et al.
Polymer Science, USSR, 14:9, 2153–2158, 1972, "The Hydrolytic Stability of Some Polyimides", Koshak, Vinogradova et al.
J. Macromol Chem., C 11 (1), 45–142 (1974).

Primary Examiner—Harold D. Anderson

[57] ABSTRACT

A soluble polyimide having a chain member substantially represented by the formula:

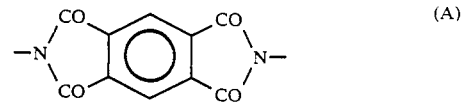

wherein X represents the following structures (A) and (B):

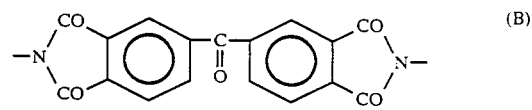

and Y represents the following structure (C):

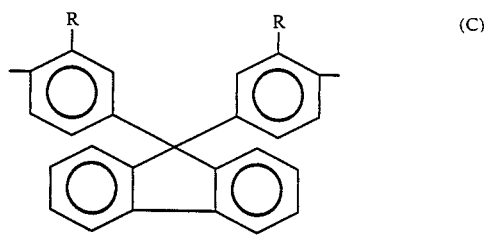

wherein R represents hydrogen, methyl, or ethyl. The polyimide has an inherent viscosity ($\eta$ inh) of 0.25 dl/g or more as determined at a temperature of 30° C. in a solution of 0.5 g of the polyimide in 100 ml of o-chlorophenol.

This polyimide has a high heat resistance, is soluble in some organic solvents, and is capable of forming a film.

5 Claims, No Drawings

SOLUBLE COPOLYIMIDE FROM 9,9-BIS (4-AMINO PHENYL) FLUORENE

BACKGROUND OF THE INVENTION

1. Field of the Invention

The present invention relates to novel soluble polyimides, which have a high heat resistance and which are soluble in some organic solvents and capable of forming a film.

2. Description of the Related Art

It is already known in the art that polyimide type polymers have extremely excellent properties, for example, heat resistance and chemical resistance, and therefore, these polyimides are especially useful as wire coatings, films, and adhesives.

Polyimides are at present produced in the following manner. That is, polyamic acids are first prepared from tetracarboxylic acid components and diamine components, and the resultant polyamic acids are then converted to imides by various methods (i.e., the so-called two step production of polyimides). However, the above-mentioned intermediate polyamides have a poor storage stability and a high, unpreferable viscosity, causing geletion even at an ambient temperature, although these polyamides have an excellent heat resistance, and thus, they must be stored under a low temperature. Furthermore, when polyamides are allowed to stand for a long period of time, a portion thereof is dehydrated to cause the ring closure, whereby polyimides are formed and insolubilized to cause the formation of turbidity.

The above-mentioned disadvantages of the production and the processing of imide type polymers can be obviated by synthesizing solvent-soluble high molecular weight polyimides. For example, Japanese Examined Patent Publication (Kokoku) No. 47-37706 and Japanese Unexamined Patent Publication (Kokoku) No. 56-36520 disclose soluble polyimides produced by using, as a tetracarboxylic acid component or a diamine component, aliphatic compounds. However, the most important property of polyimides, the heat resistance, is unpreferably decreased in these polyimides.

Furthermore, polyimides, which are derived from biphenyl tetracarboxylic acid and p-phenylene diamine, disclosed in Japanese Unexamined Patent Publication (Kokai) No. 50-113597 can maintain a high heat resistance, but can be dissolved only in phenol solvents such as m-cresol and xylenol. However, it is difficult to dissolve polyimides at a high concentration with these solvents, and in addition, it is difficult to produce polyimide films having excellent mechanical properties. The cardo polymers are summarized in J. Macromol Chem., C 11 (1), 45-142 (1974).

SUMMARY OF THE INVENTION

The objects of the present invention are to eliminate the above-mentioned disadvantages and to provide novel polyimides soluble in organic solvents as well as in phenol solvents, while maintaining a desired high heat resistance of the polyimides.

Other objects and advantages of the present invention will be apparent from the following description.

In accordance with the present invention, there is provided a soluble polyimide having a chain member substantially represented by the repeating unit:

$+X—Y+$ wherein X represents the following structures (A) and (B):

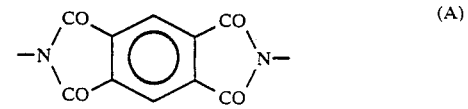

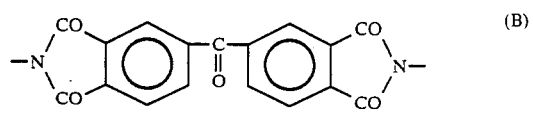

and Y represents the following structure (C):

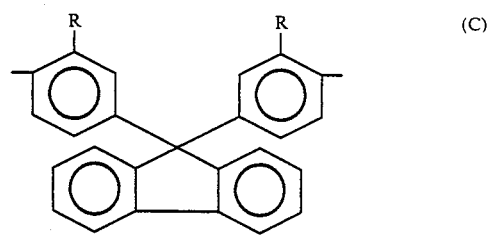

wherein R represents hydrogen, methyl, or ethyl, said polyimide having an inherent viscosity ($\eta$inh) of 0.25 dl/g or more as determined at a temperature of 30° C. in a solution of 0.5 g of said polyimide in 100 ml of o-chlorophenol.

DESCRIPTION OF THE PREFERRED EMBODIMENTS

According to the present invention, the solubilization of polyimides is intended without decreasing the desired heat resistance. However, the solubility and the heat resistance are opposite properties and, therefore, when the solubility is increased, the heat resistance is generally decreased. Accordingly, the present inventors have made a study of the solubilization of polyimides while maintaining the glass transition temperature and the decomposition temperature, and as a result, have found the above-mentioned soluble polyimides substantially having the repeating unit $+X—Y+$.

The above-mentioned structure X constituting the present soluble polyimides is composed of the above-mentioned components (A) and (B) and the structure Y is composed of the component (C). The structures of the polymers derived from the components (A), (B), and (C) are considered to be the polymer structure $+A—C+$ and $+B—C+$. Of these structures, the structure $+A—C+$ has a good heat stability but does not have a substantial solubility in solvents. On the other hand, the structure $+B—C+$ is soluble in solvents but exhibits a low heat resistance. For these reasons, according to the present invention, the structures of the present polyimides are limited to those having the above-mentioned structures. The use of the above components is essential for obtaining polyimides having both the desired heat resistance and solubility. The preferable mole ratio of the componemnts (A) to (B) is within the range of from 1:99 to 70:30, more preferably 1:99 to 60:40, and especially preferable 5:95 to 60:40.

The component (A) is derived from, for example, pyromellitic dianhydride, and the component (B) is derived from, for example, benzophenone tetracarboxylic dianhydride. Furthermore, the component (C) can be derived from, for example, 9,9-bis(4-aminophenyl)-fluorene or derivatives thereof having one or more substituents (e.g., alkyl groups) introduced into the aromatic ring.

The polyimides according to the present invention have an inherent viscosity ($\eta$inh), determined at a temperature of 30° C. in a solution of 0.5 g of the polyimide in 100 ml of o-chlorophenol, of 0.25 dl/g or more, preferably 0.30 dl/g or more, more preferably 0.35 dl/g to 5 dl/g. When the inherent viscosity is less than 0.25 dl/g, the polymerization degree is low and, therefore, the moldability and the processability are decreased. That is, the formation of films and the like becomes difficult and the physical properties such as tensile strength become unsatisfactory.

The polyimides according to the present invention may be dissolved in at least one solvent selected from the group consisting of dimethyl acetamide, N-methyl pyrrolidone, m-cresol, o-chlorophenol, and methylene chloride. The solubility is increased with the increase of the mole ratio of the component (B) in the components (A) and (B) of the polyimide.

The polyimides of the present invention can be produced by, for example, gradually adding a solid mixture of pyromellitic dianhydride and benzophenone tetracarboxylic dianhydride to a solution of 9,9-bis(4-aminophenyl)fluorene in a solvent such as m-cresol or o-chlorophenol, followed by heating at a temperature of 20° C. to 50° C. for 1 to 4 hours, preferably 2 to 4 hours, 120° C. to 180° C. for 1 to 3 hours, and 180° C. to 220° C. for 1 to 3 hours. During the final step of the polymerization reaction, the water formed in the reaction should be removed from the reaction mixture by utilizing the azeotropic distillation technique.

Thus, the desired polyimides having a high heat resistance and good solubility can be obtained.

EXAMPLES

The present invention now will be further illustrated by, but is by no means limited to, the following Examples and Comparative Examples.

EXAMPLE 1

In 40 ml of m-cresol, a mixture of 0.65 g of pyromellitic dianhydride and 0.95 g of benzophenone tetracarboxylic dianhydride (i.e., the mole ratio of the components (A) to (B) is 5:5) and 2.09 g of 9,9-bis(4-aminophenyl)fluorene were suspended. The mixture was then stirred, while blowing gaseous nitrogen, at a temperature of 40° C. for 2 hours, and after confirming the formation of the homogeneous solution, the resultant solution was stirred at a temperature of 150° C. for a further 2 hours.

Furthermore, the solution was heated to a temperature of 190° C. Then, after attaching a distillation apparatus to the reaction apparatus, and while m-cresol was additionally added to the reaction system in an amount corresponding to that of the distilled liquid, the reaction mixture was stirred for a further 2 hours followed by cooling to room temperature. The reaction solution thus obtained was uniform and homogeneous. The solution was cast on the surface of a glass plate to form a film.

The polyimide in the form of a film obtained above did not exhibit a glass transition temperature and had a decomposition initiating temperature of 500° C. and an excellent heat resistance. The polyimide was soluble in dimethyl acetamide, N-methyl pyrrolidone, m-cresol, and methylene chloride.

The inherent viscosity ($\eta$inh) of the polyimide obtained above was determined by dissolving 0.5 g of the polyimide in 100 ml of o-chlorophenol. The determination was carried out at a temperature of 30° C. in a constant temperature bath. The inherent viscosity as determined was 0.53 dl/g. The IR absorption spectrum of the polyimide obtained above clearly exhibited the absorbance of an imide ring at 1720 cm$^{-1}$ and 1780 cm$^{-1}$.

EXAMPLES 2 to 6

The polyimides were prepared in the same manner as in Example 1, except that the amounts of the components (A) and (B) were changed as shown in Table 1.

The results including the results of Example 1 are shown in Table 1. The decomposition initiating temperature was a temperature at which the decrease in the weight of the sample polyimide was initiated as determined by a thermogravity analysis (TG).

The polyimide of Example 3 has the following physical properties:
Tensile strength: 10.0 kgf/mm$^2$
Tensile modulus: 410 kgf/mm$^2$
Volume resistivity: 2.6×10$^{15}$ Ω·cm
Total light transmittance: 86.5%

TABLE 1

| Example | A (g) | B (g) | Mole ratio (A/B) | Decomposition initiating temp. (°C.) | $\eta$ inh (dl/g) | Solubility* o-Chlorophenol | N—Methylpyrrolidone | Dimethyl acetamide | Methylene chloride |
|---|---|---|---|---|---|---|---|---|---|
| 2 | 0.91 | 0.57 | 7/3 | 510 | 0.83 | o | o | o | x |
| 3 | 0.78 | 0.68 | 6/4 | 500 | 0.63 | o | o | o | o |
| 1 | 0.65 | 0.95 | 5/5 | 500 | 0.53 | o | o | o | o |
| 4 | 0.39 | 1.33 | 3/7 | 490 | 0.53 | o | o | o | o |
| 5 | 0.13 | 1.71 | 1/9 | 470 | 0.56 | o | o | o | o |
| 6 | 0.01 | 1.88 | 1/99 | 455 | 0.41 | o | o | o | o |

*O - soluble at room temperature at a 15% by weight solution.
X - not soluble at room temperature at a 15% by weight solution.

COMPARATIVE EXAMPLES 1 AND 2

The polyimides were prepared in the same manner as in Example 1, except that, as the components (A) and (B), 1.30 g of pyromellitic dianhydride (i.e., Comparative Example 1, only the component (A)) and 1.93 g of benzophenone tetracarboxylic dianhydride (i.e., Comparative Example 2, only the component (B)) were used.

The product in Comparative Example 1 did not substantially exhibit a solubility in organic solvents at room temperature at a 15% by weight solution.

On the other hand, in the case of the product in Comparative Example 2, in which only the component (B), benzophenone tetracarboxylic dianhydride, was used, the product was soluble in dimethyl acetamide, methylene chloride, N-methyl pyrrolidone, and m-cresol. The inherent viscosity (ηinh) was 0.41 dl/g and the decomposition initiating temperature was 455° C.

COMPARATIVE EXAMPLE 3

Benzophenone tetracarboxylic type polyimide was prepared by a conventional two step method.

To a solution of 2.09 g of 9,9-bis(4-aminophenyl)-fluorene in 40 ml of dimethyl acetamide, 1.93 g of benzophenone tetracarboxylic dianhydride was gradually added and the mixture was then stirred at room temperature for 20 hours.

The resultant polyamide acid was cast on a glass plate and then baked or heated at a temperature of 220° C. to accelerate the reaction. Thus, the polyimide film was prepared by a conventional method.

The glass transition temperature of the polyimide obtained above the decomposition initiating temperature was 455° C. Thus polyimide was not soluble in the above-mentioned solvents at room temperature at a 15% by weight solution.

As mentioned above, soluble polyimides are not substantially commercially available at present, and it is believed that the areas of application for polyimides are limited because of a disadvantageous processability thereof (e.g., solubility in a solvent), although the polyimides have excellent physical properties.

Accordingly, heretofore polyamide acids, which are the precursor of polyimides, have been used and baked to form polyimides. However, since the polyimides according to the present invention have an improved solubility in solvents, compared to the conventional polyimides, and also have a good heat resistance, the present polyimides can be widely used in, for example, the electrical and electronic fields.

Furthermore, since the present polyimides are novel polyimides, in which the problems of the conventional polyimides are overcome, the present polyimides also can be widely utilized in various fields of application, for example, as heat resistant coating compositions, various coating materials, and hollow fibers. Thus, it is clear that the present invention is industrially useful.

We claim:

1. A soluble polyimide having a chain member substantially represented by the repeating unit:

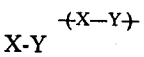

wherein X represents the following structures (A) and (B):

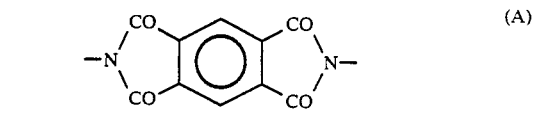

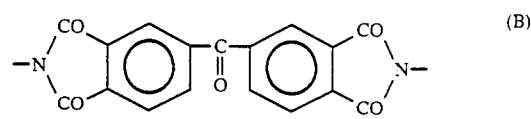

and Y represents the following structure (C):

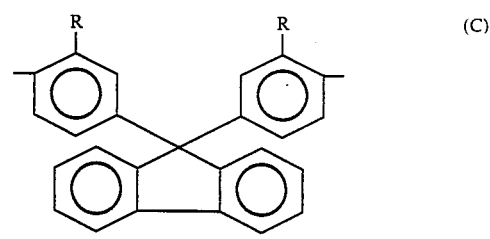

wherein R represents hydrogen, methyl, or ethyl said polyimide having an inherent viscosity (ηinh) of 0.25 dl/g or more as determined at a temperature of 30° C. in a solution of 0.5 g of said polyimide in 100 ml of o-chlorophenol, said polyimide being produced by a one step method from dianhydrides forming the structures (A) and (B) with a diamine forming the structure (C) in a solvent; said polyimide being soluble in an organic solvent and wherein said polyimide has a heat decomposition initiating temperature of at least 455° C.

2. A soluble polyimide as claimed in claim 1, wherein the mole ratio of hte structures (A) to (B) is 1:99 to 70:30.

3. A soluble polyimide as claimed in claim 1, wherein the mole ratio of the structures (A) to (B) is 1:99 to 60:40.

4. A soluble polyimide as claimed in claim 1, wherein said polyimide is soluble in at least one solvent selected from the group consisting of dimethyl acetamide, N-methyl pyrrolidone, m-cresol, o-chlorophenol, and methylene chloride.

5. A soluble polyimide as recited in claim 1 wherein said polyimide is soluble at room temperature at a 15% by weight solution in at least one solvent selected from the group consisting of dimethyl acetamide, N-methyl pyrrolidone, m-cresol, o-chlorophenol, and methylene chloride.

* * * * *

UNITED STATES PATENT AND TRADEMARK OFFICE
CERTIFICATE OF CORRECTION

PATENT NO. : 4,845,185

DATED : July 4, 1989

INVENTOR(S) : T. Teramoto, et al.

It is certified that error appears in the above-identified patent and that said Letters Patent is hereby corrected as shown below:

Column 5, line 49, delete "X-Y".

Column 6, line 35, change "hte" to --the--.

Signed and Sealed this

Eighth Day of May, 1990

Attest:

HARRY F. MANBECK, JR.

*Attesting Officer*  *Commissioner of Patents and Trademarks*